Aug. 7, 1956 A. V. L. C. DEBRIE 2,757,572
DEVICE FOR ALTERNATELY PROJECTING CINEMATOGRAPHIC
FILMS OF TWO DIFFERENT SIZES
Filed Jan. 28, 1953 2 Sheets-Sheet 1
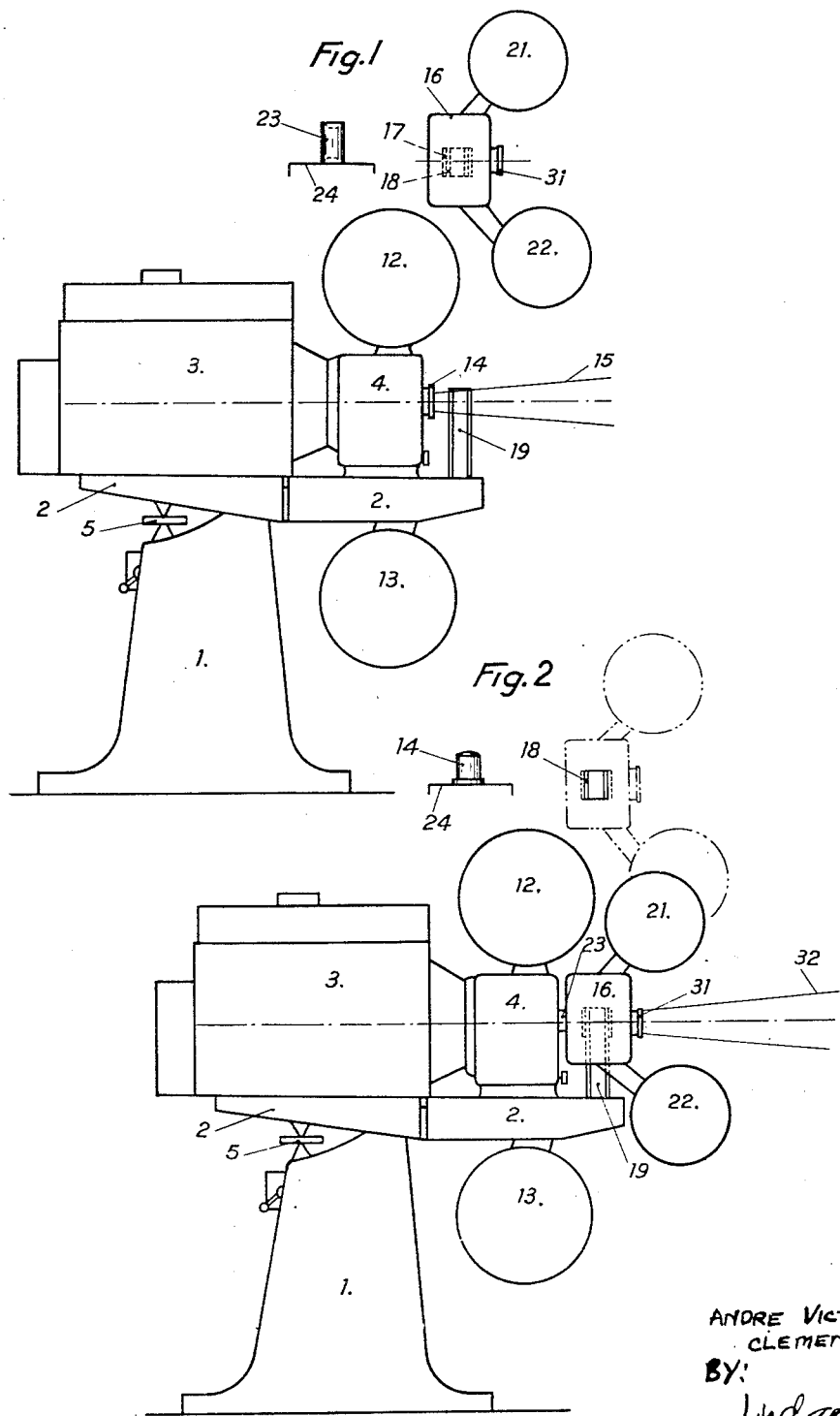
INVENTOR:
ANDRE VICTOR LÉON
CLEMENT DEBRIE
BY:

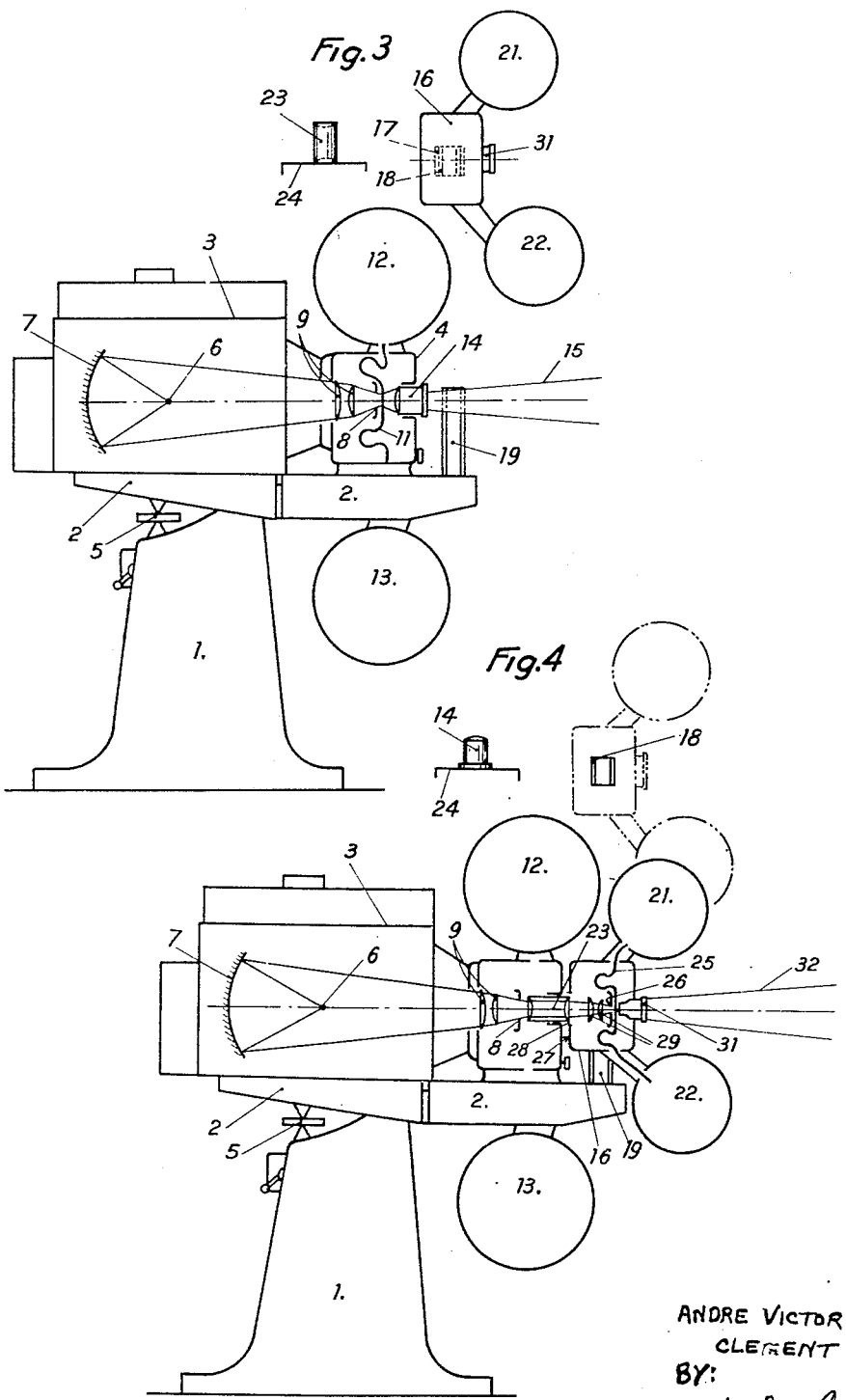

United States Patent Office 2,757,572
Patented Aug. 7, 1956

2,757,572

DEVICE FOR ALTERNATELY PROJECTING CINEMATOGRAPHIC FILMS OF TWO DIFFERENT SIZES

André Victor Leon Clement Debrie, Paris, France

Application January 28, 1953, Serial No. 333,632

Claims priority, application France July 4, 1949

3 Claims. (Cl. 88—24)

The present application is a continuation-in-part of my prior application Serial No. 169,603, now abandoned.

The object of the present application is to provide a device that permits, by means of an equipment suitable for projecting, for example, 35 mm. films and comprising a complete supporting leg, a lamp and a projector complete with its objective, the very rapid passage to the projection of 16 mm. films, for example, by utilizing the total flux of the illuminating lamp employed for the 35 mm. size to project exactly with the same flux and on the same show screen the images of the 16 mm. film and those of the 35 mm. film, by utilizing a 16 mm. projector provided with its own objective but having no lamp and no particular supporting leg; this 16 mm. projector comes to be fixed before the 35 mm. projector, with the same common optical axis for the both projectors, on a part secured in respect to the 35 mm. projector, whereby the 16 mm. projector is automatically given a position identified for the purpose, the objective of 35 mm. projector being at that moment removed and replaced by a device modifying the travel of the luminous flux passing through the projection window of the 35 mm. projector in such way that this flux is integrally concentrated in the image window of the 16 mm. projector.

The cost-saving of such device results from the following points:

1. Cheaper purchase, since on the 16 mm. equipment, that would be necessary, there are economized a complete supporting leg and an illuminating lamp, whose price exceeds largely that of the fastening means added to the 16 mm. projector and to the support of the 35 mm. projector and that of the auxiliary condenser to be interposed into the light beam in lieu of the 35 mm. objective prior to the 16 mm. projection.

2. Considerable saving in space requirement, since the space requirement of an installation, to be housed in a cabin, for the alternate projection of two film sizes is substantially the same as that necessary for the installation of the single 35 mm. projector with its accessories, the possibility of projecting alternately the 35 mm. or 16 mm. film being given by a 16 mm. projector which, without arc lamp and without particular supporting leg, requires but little space, whether it is at rest or set in position before the 35 mm. projector. In many cases it will thus be possible to utilize an existing cabin, without spending money for a new cabin that would be necessary for the additional installation of a 16 mm. projector having lamp and particular supporting leg.

3. Easy positioning and framing of the image upon the show screen, effected by the exact automatic positioning of the 16 mm. projector before the 35 mm. projector.

4. Complete utilization of the light serving for the larger film projection when the smaller film is being projected.

5. Conservation of the luminous flux and even, substantially, of the magnitude of the image projected upon the screen, since the focal distances of the two objectives of projection remain, respectively, in the same relationship to the dimensions of the images to be projected.

In order that the invention may be more clearly understood, I have shown in the accompanying schematic drawings device by which the same may be executed.

In the drawings:

Fig. 1 shows in elevation the device in operation for the projection of the 35 mm. film;

Fig. 2 shows in elevation the device in operation for the projection of the 16 mm. film;

Fig. 3 shows in longitudinal section the travel of the beam of light for the projection of the 35 mm. film; and Fig. 4 shows in longitudinal section the travel of the beam of light for the projection of the 16 mm. film.

Similar numerals refer to similar parts throughout the several views.

Denoted by reference 1 is the supporting leg of the 35 mm. projector provided for example with the cradle 2 assembling the lamp 3 and the 35 mm. projector 4. The cradle 2 is inclinable, with respect to the leg 1, by known means schematically shown at 5.

The lamp has its source of light at 6 and a concave mirror 7 concentrates the beam of light in the projection window 8 of the projector, through its condenser 9, upon the 35 mm. film 11 passing from the feeding reel 12 onto the receiving reel 13 in a known way.

Means for obturating, advancing, guiding, framing and regulating the film, as well as for reading sounds, are those currently employed and, as they form no part of the present application, they are not shown.

The light, having passed through the film 11, passes through the objective 14 and the resulting beam of light 15 is focused upon the show screen (not shown) forming thereupon images proceeding from the film 11.

During this projection the 16 mm. projector 16, complete but without either lamp or leg or cradle, is placed in any lieu of the projection cabin and, for example, is attached to one of the walls by means of a part 17 secured onto this projector 16 and received on a part secured to any convenient support, a wall for example.

The part 18 will form, preferably with the part 17, a means of rapidly setting in determined position or out of position.

The assembly of 18 with 17 is conveniently reproduced at the end, for example, of a rigid supporting part 19 fixed, out of the way of the beam of light, onto the cradle 2 upon which the 35 mm. projector 4 is fixed.

These fixing means, forming no part if the invention, are not described nor shown in detail.

For convenience of the description, the smaller size projector 16 has been shown on the left and higher than the projector 4. Actually, it will be placed in a lieu where its take-off and its replacement may be convenient and where the loading and unloading with film of its feeding reel 21 and its receiving reel 22 may be conveniently operated.

An auxiliary condenser 23 will also be disposed within reach of the operator, for example upon a console or table 24, or in any other lieu.

In these conditions, the passage from the 23 mm. projection to the 16 mm. projection is effected (Figs. 2 and 4) in the following way:

The 35 mm. projector being stopped, the film 11 is withdrawn from the image window 8. The objective 14 of projector 4 is also withdrawn and is replaced by the auxiliary condenser 23. The projector 16 is then set in position by conveniently disposing and securing its clamping part 17, onto the corresponding position of supporting part 19.

The projector 16 is provided with its feeding and receiving reels 21 and 22, respectively, and with the film 25 placed into its passageway against the image window 26 of the projector 16 whose back 27 is open at 28 to make way for the light beam. The operation is clear. The beam of light which, in the absence of the film 11, would diverge after having passed through the window 8, is taken up by 23 and, with optical elements conveniently established, this beam of light, crossing the condenser 29, is entirely concentrated upon the film 25 through the image window 26 of projector 16 and, through the objective 31 of projector 16 in motion, comes out as a beam 32 which is focused upon the show screen (not shown). If the characteristics of the beams of light 15 and 31 are conveniently selected the beams of light 15 and 32, illuminating the show screen, will correspond, account being taken of losses due to the optical elements traversed, to the totality of the luminous flux reflected by 7, but will further have, practically, the same solid angle, whereby images of the same size and illumination will be given, for comparable types, on the show screen.

In the case schematically shown each projector has its own driving means and, if so desired, sound reading means.

Amplifying means and, of course, loud speakers, may be branched alternately onto the apparatus in operation.

The invention would not be invalidated by automatically branching, with the aid of known means, the smaller size projector onto the motor and electronic amplifying means of the larger size projector, solely because of positioning the smaller size projector for projection; this positioning may or may not effect the separation of these elements in respect to the larger size projector. The removal of the smaller size projector controls the reverse operations.

It is clear that operations reverse of those described will permit the rapid passage, without trials from the projection of 16 mm. films to that of 35 mm. films.

It is to be understood that the terms 35 mm. and 16 mm. employed in the present specification, are given only by way of non-limiting examples and are to be read as including any two film sizes one of which is smaller than the other.

In the example shown the auxiliary condenser is positioned in the objective carrier of the 35 mm. projector as a substitute for its objective and the condenser of 16 mm. projector is conserved.

Without departing from the spirit of the invention, it will be possible, when allowed by dimensions of light passages, to dispose the auxiliary condenser such as it is carried by the 16 mm. projector, to play the same role as in the description.

In this case it is possible to conceive this condenser either coexisting and cooperating with the condenser of the 16 mm. projector, or simultaneously replacing the latter. In lieu of interposing an auxiliary condenser, it is even possible to modify the beam of light passing through the 35 mm. projector, when the 16 mm. projector is in operation, by any known means permitting of directly concentrating the beam of light gathered at the outlet of the 35 mm. projector, upon the image window of the 16 mm. projector, for example marked shifting means of the mirror or the light source, or the both.

What I claim is:

1. Apparatus for cinematographically projecting films of two different sizes alternately, comprising, in combination, a base; a light source mounted on said base; first cinematographic projection means mounted on said base ahead of said light source to be illuminated thereby and including a light guiding means, a film advancing and feeding means for moving a film strip of a first size through said first projection means, and means at the front end of said first projection means for removably supporting an objective thereon; and second cinematographic projection means mounted on said base ahead of said first cinematographic projection means to be illuminated by light passing from said light source through said first projection means and through said means for removably supporting the objective of said first projection means, said second projection means being smaller than said first projection means, having an optical axis coinciding with the optical axis of said first projection means, and including a light guiding means, a film advancing and feeding means for moving through said second projection means a film strip of a second size smaller than said first size, and an objective mounted at the front end of said second projection means, whereby the latter is illuminated from the same light source which illuminates said first projection means and is mounted on the same base which carries said first projection means.

2. Apparatus for cinematographically projecting films of two different sizes alternately, comprising, in combination, a base; a light source mounted on said base; first cinematographic projection means mounted on said base ahead of said light source to be illuminated thereby and including a light guiding means, a film advancing and feeding means for moving a film strip of a first size through said first projection means, and means at the front end of said first projection means for removably supporting an objective thereon; second cinematographic projection means mounted on said base ahead of said first cinematographic projection means to be illuminated by light passing from said light source through said first projection means and through said means for removably supporting the objective of said first projection means, said second projection means being smaller than said first projection means, having an optical axis coinciding with the optical axis of said first projection means, and including a light guiding means, a film advancing and feeding means for moving through said second projection means a film strip of a second size smaller than said first size, and an objective mounted at the front end of said second projection means, whereby the latter is illuminated from the same light source which illuminates said first projection means and is mounted on the same base which carries said first projection means; and means removably connecting said second cinematographic projection means to said base so that after said second projection means is removed from said base the objective of said first projection means may be replaced thereon to render said first projection means operative for projecting a film strip of said first size.

3. Apparatus as defined in claim 2 and wherein said light guiding means of said second projection means extends into the means for removably supporting the objective of said first projection means.

References Cited in the file of this patent

UNITED STATES PATENTS

| 1,807,737 | Goldhammer | June 2, 1931 |
| 2,144,209 | Vollenweider | Jan. 17, 1939 |
| 2,354,679 | Frankel | Aug. 1, 1944 |
| 2,438,333 | Dickman | Mar. 23, 1948 |
| 2,452,745 | Getter | Nov. 2, 1948 |
| 2,611,293 | Weiss | Sept. 23, 1952 |
| 2,651,968 | Frey | Sept. 15, 1953 |

FOREIGN PATENTS

| 847,038 | France | June 19, 1939 |